Oct. 7, 1952 — W. J. HUGHES — 2,613,056
ROTARY DISK VALVE
Filed Nov. 13, 1947
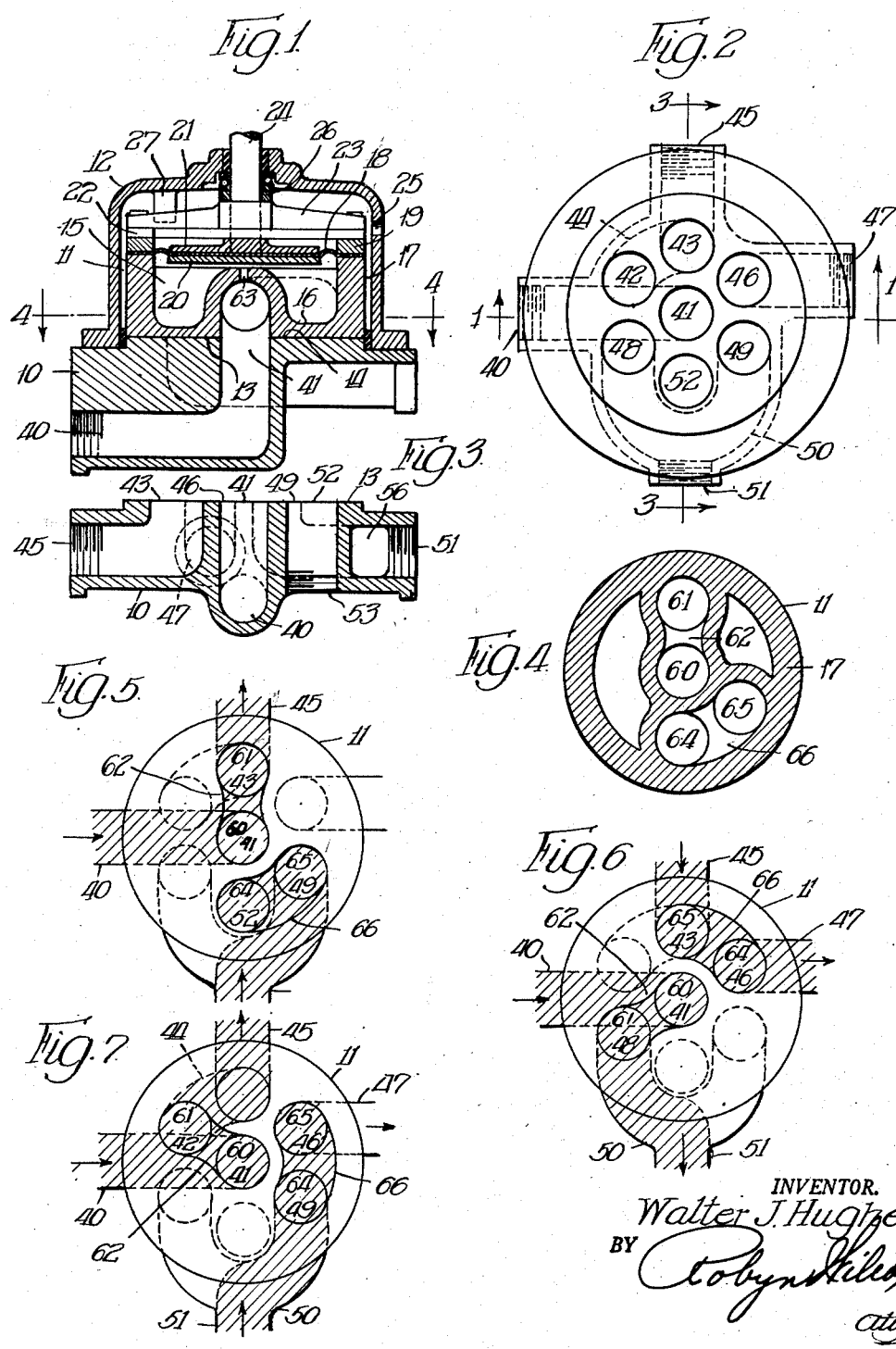
INVENTOR.
Walter J. Hughes,
BY Patented Oct. 7, 1952

2,613,056

UNITED STATES PATENT OFFICE 2,613,056

ROTARY DISK VALVE

Walter J. Hughes, Chicago, Ill., assignor to Infilco Incorporated, Chicago, Ill., a corporation of Delaware Application November 13, 1947, Serial No. 785,624

7 Claims. (Cl. 251—85)

1

This invention relates to a rotary valve adapted to control a plurality of flows, such as the flows through a filter, or the like.

One object of the invention is to provide a rotary disc valve adapted to control flows through a filter, or softener, which avoids the use of springs to keep the valve parts properly seated.

Another object of this invention is to provide a dynamically balanced rotary valve which eliminates the tendency, common in some structures of this type, for one side of the valve disc to become unseated or tipped from the valve seat.

A still further object of this invention is to provide a more simple and cheaper valve adapted to control the various flows through a filter or softener, both of which generally have three separate flows: filtering to use, backwashing, and rewashing to waste.

A still further object of this invention is to provide a three position valve suitable to control three separate flows through a filter or softener or other liquid treating apparatus.

A still further object is to provide a rotary disc valve which possesses a predetermined seating force for the respective valve ports.

These and other objects of the invention will be apparent from the description and claims which follow.

Briefly, my new valve comprises a fixed valve seat which is provided with an inlet port at the center and a plurality of peripheral ports adapted to conduct the flows in the various directions, and a rotatable valve disc which provides a conduit between the inlet port and selected peripheral ports and another conduit between other peripheral ports, whereby the flows may be controlled as desired. In the preferred form of my apparatus the rotary valve disc is kept firmly seated upon the seat by means of hydraulic pressure, the total amount of which may be predetermined as desired so as to provide a valve which is readily movable to the desired positions, but in which the seating force will always overbalance any unseating force by a predetermined amount. My apparatus will be more readily understood by a consideration of the drawing which shows various portions of my preferred form of valve and in which:

Figure 1 represents a diametrical, vertical, cross-sectional view of a preferred form of my invention, taken along a vertical plane through the inlet, as is designated by the lines 1—1 of Figure 2;

Figure 2 is a plan view of the base, or fixed, seat of the apparatus shown in Figure 1;

2

Figure 3 is a transverse, vertical, cross-sectional view of the seat taken along the vertical plane indicated by the lines 3—3 of Figure 2;

Figure 4 is a horizontal cross-sectional view of the rotatable disc taken at the horizontal plane indicated by the lines 4—4 of Figure 1;

Figure 5 is a plan view of the rotatable valve disc, superimposed upon the stationary seat, when the valve is in the filtering position;

Figure 6 is a cross-sectional plan view of the rotatable valve disc, superimposed upon the stationary seat, when the valve is in the backwashing position;

Figure 7 is a cross-sectional plan view of the rotatable valve disc, superimposed upon the stationary seat, when the valve is in the rewash position, in which position flow passes through the filter or softener in the same manner as when passing through for use, but in which the effluent is discharged to waste.

A cross-sectional view of the preferred embodiment of my assembled apparatus is shown in Figure 1. The valve assembly comprises a fixed, or stationary, seat portion 10, a rotatable valve disc 11, a cover 12, and means to be described hereafter for holding the valve disc on the seat, and means for rotating the valve disc 11. The seat 10 preferably is provided with an upraised circular seating surface 13, as shown in Figures 1 and 3—and in which are a plurality of ports to be described in detail hereafter. However, at the present time, it can be noted that an inlet conduit 40 leads to an inlet port 41 which is located in the exact center of the valve seat 13. The rotatable valve disc 11 is provided with four ports located as hereinafter described. The rotatable valve disc is provided with a seating surface 14 of the same size as the seating surface 13 of the seat 10.

The valve disc 11 is formed to provide a chamber 15 having bottom 16 and side wall 17 of predetermined thickness and various ports and conduits to be described hereafter. A diaphragm 18 is clamped to the side wall 17 of the valve disc 11 by a flanged clamping ring 19. Diaphragm center plates 20 and 21 are clamped to the diaphragm 18 by any suitable means not shown. Preferably the diaphragm center plates 20 and 21 are of relatively large size in order to expose only a small annular part of the area of the diaphragm to the hydraulic pressure in the chamber 15. The clamping ring 19 is provided with a pair of diametrically opposed slots 22 in which operates a cross member or bar 23, which is pinned on the rotatable shaft 24. The hub of bar 23 conveys the thrust from the diaphragm center plates to the cover 12 through ball thrust bearing 26. The shaft 24 serves to rotate the valve 11 on its seat 10 and the thrust bearing 26 serves to take the upward thrust of the diaphragm center plates. The shaft 24 may be rotated manually or by any suitable means through an arc, in my preferred embodiment, of 120 degrees.

The cover plate 12 is provided with a small air vent 25 in order to provide for atmospheric pressure within the chamber formed by the cover. The cover is rigidly secured to the stationary seat portion by any suitable means such as bolts or machine screws, not shown. The cover is also provided with a pair of stops 27, one of which is shown in Figure 1 and the other of which, in the preferred embodiment herein described, would be located at an angular distance of 120 degrees in a counter-clockwise direction therefrom.

The seat portion is provided with an inlet port 41 which communicates with the inlet conduit 40. The inlet port 41 is located, as mentioned above, at the center of the raised seating face 13. Equally spaced around the periphery of the stationary valve seat are six ports. Two of these adjacent ports 42 and 43 are connected by a short passageway 44 and communicate with a "top" outlet 45, which is adapted to be connected to the top of a filter or softener. The next port, in a clockwise direction, is a waste port 46 which communicates with waste outlet 47. The fourth and sixth ports 48 and 49 (adjacent the first "top" port 42 and adjacent the waste port 46) are connected by a branched passage 50 which in turn connects, as at 51, to a "bottom" pipe adapted to be connected to the bottom of a filter or softener, or the like. The fifth port 52 (located between the bottom ports 48 and 49) communicates with an outlet connection 53, which delivers water to use. It will be understood that these seat ports are equidistant from the center inlet port 41 and are equally spaced one from another.

The rotatable valve disc is provided with four ports, as is best shown in Figure 4. In the center of the rotatable disc 11 is a center port 60 which will register with the inlet port 41 when this disc is superimposed upon the seat 10. Thus in all positions of the disc, its inlet port 60 registers with the inlet port 41 of the seat. A port 61, at the same radial distance from the center as the row of ports around the center of the seat, is connected to port 60 by passage 62. This connecting passage 62 has a port 63, shown in Figure 1, which equalizes pressure in chamber 15 with that of the inlet. A second peripheral port 64 is diametrically opposite peripheral port 61, as is shown in Figure 4. Spaced 60 degrees from the port 64 is port 65, to which it is connected by the connecting passage 66, as shown.

Figure 5 shows the relative position of the valve disc 11 and its seat 10 in operating or filtering position. Liquid to be treated enters through the inlet conduit 40 and passes through the inlet port 41 into the registering center port 60, through passageway 62 to port 61, thence through port 43 of the seat and into the top connection, or conduit 45, by means of which the water will be conducted to the top of the softener or filter. From the bottom of the filter or softener, not shown, the water enters the valve at connection 51, through conduit 50 to port 49 of the seat, thence to port 65, passage 66, and port 64 of the disc to outlet port 52 of the seat, and thence through conduit 53 to use. The flow so described is shown by cross-hatching the conduits and ports mentioned—the direction of flow being indicated by the arrows.

When the filter or softener is exhausted and has to be prepared for reuse the valve shaft 24 is rotated in a counter-clockwise direction through an angle of 120 degrees. The relative position of the disc and seat is now shown in Figure 6. Flow now is as follows: from inlet conduit 40 and inlet port 41 into the registering central port 60, passageway 62, and port 61 of the disc to port 48, conduit 50 and to bottom connection 51 of the seat, from which it is conducted to the bottom of the softener or filter. The water flowing upward through the softener or filter provides a reverse wash. This wash water flows from the top of the softener or filter to top connection 45 from which it is passed to port 43 of the seat, thence to port 65, passage 66, and port 64 of the disc, and thence to registering waste port 46 and out waste conduit 47.

After the reverse wash it is customary to wash the filter or softener for a short period with a flow that is passed to waste, such step being commonly called "rewashing." In my valve the shaft 24 is now rotated in a clockwise direction through an angle of 60 degrees to the rewash position shown in Figure 7. Water now enters through inlet conduit 40 and inlet port 41 of the seat from where it is conducted by the registering center port 60, passageway 62 and port 61 of the disc to port 42, passage 44 to top connection 45. After passing downwardly through the filter or softener the rewash water is conveyed from the filter to the bottom connection 51 of the seat, from where it flows through conduit 50, and port 49 to port 64, passage 66 and port 65 of the disc to waste port 46 of the seat, and thence to waste through conduit 47.

To terminate rewashing the valve shaft 24 is rotated clockwise through another angle of 60 degrees to return it to the original position shown in Figure 5. In this position water to be treated is brought through the valve and conducted to top port 43 and thence to the top of the treating apparatus. After passing through the treating apparatus the water passes, by means of the piping to the bottom connection 51, and is then conducted by means of the ports and passageways described to outlet port 52 and outlet connection 53.

The area of the seat ports in their symmetrical arrangement apply a substantially even lifting force to the disc, and, as is seen from the drawings, substantially no tipping force exists.

The port 63 permits pressure equalization in the chamber 15 with that of the inlet and subjects the underside of diaphragm 18 to the same pressure. The center plate 21 conveys the diaphragm thrust to the cover through the hub of the cross bar 23 and the thrust bearing. The pressure within the chamber 15 obviously operates in all directions and therefore operates to thrust the valve disc firmly against its seat. The value of the seating force may be predetermined. For example, the area of the base of the chamber 15 may be made greater than the aggregate areas of the seat ports and preferably by about 50 percent. To carry out the example, assume that the six ports under pressure are 1 inch in diameter; area of $6 \times 1 \times .7854 = 4.72$ square inches. Then at 100 pounds per square inch the lifting force is 472 pounds. Thus if we make the area of the base of the chamber 15

4.72×1.5=7.06 square inches or 3 inches in diameter, then the seating force is 706 pounds, at 100 pounds per square inch, minus 472 pounds or a total seating force of 234 pounds. However, since half of the annular exposed area of the diaphragm 18 adjacent the locking ring gives lifting force to the disc, the exposed area is kept small by making the center plates of only slightly lesser diameter than that of the chamber 15. If the gap is made one-fourth inch, then this lift is 100×7.06−100×5.93=113 pounds and the net seating force is 234−113=121 pounds. In this example it has been assumed that all six ports are under the same pressure, though actually this may not be true due, for example, to the waste port 46 being connected to atmosphere. Sometimes, however, the waste line 47 leads to an overhead drain of considerable elevation and is, therefore, under considerable back pressure. Further, in the calculation of the area of the chamber 15 the area of the inlet port 41, which is balanced out in the valve system and amounts only to approximately 10% of the total area of chamber 15, has not been deducted. In actual design this area is ignored, along with the fact that the waste port 46 may or may not be under considerable back pressure.

It will be obvious therefore that the seating force may be adjusted to any desired value by changing the diameter of the chamber 15 and the diaphragm or of the diaphragm center plate or both. Changing the exposed area of the diaphragm, the outer annular half of which supplies lifting force to the disc, is very effective in reaching a desired seating force value. Reducing the seating force obviously eliminates wear and begets easier operation.

It is to be understood that the use of this invention is not limited to water softeners or filters which have been used in explaining its operation. Such a valve can be used for control of liquid flows through any apparatus in which a plurality of flows pass through the valve. It is also to be understood that the invention is not limited to the details above described, but may comprehend such other features or arrangements as may be consistent with the claims herein.

I claim:

1. A rotary disc valve comprising a stationary seat, an inlet port in the center of said seat, a plurality of equally spaced peripheral ports equidistant from the inlet port, a rotatable valve disc co-acting with the stationary valve seat, a central port in the rotatable valve disc registering with the inlet port of the stationary seat, a peripheral port in the rotatable disc, a passageway connecting said ports in said rotatable valve disc, a pair of connected peripheral ports in said rotatable valve disc, one of said ports being diametrically opposite the first peripheral port in said disc and the other spaced therefrom by an angle of 60 degrees, means to rotate said valve disc, and means to force said disc against said seat, comprising a wall surrounding said disc, a diaphragm across the open face of said disc and forming with said disc and wall a chamber, means opposing outward movement of said diaphragm, and a port connecting said passageway and said chamber in all positions of said disc.

2. A rotatable disc valve for controlling flows through a filter comprising a stationary valve seat having an inlet port in the center of said seat and six equally spaced peripheral ports equidistant from the inlet port, two adjacent peripheral ports being connected to a common conduit adapted to be connected to the top of the filter, the third such port being connected to a waste outlet, the fourth and sixth such ports being connected to a common conduit adapted to be connected to the bottom of the filter and the fifth such port being connected to an outlet conduit adapted to deliver treated water to use; a rotatable valve disc bearing against the stationary valve seat, said rotatable valve disc having a central port registering with the inlet port of the stationary seat, a peripheral port spaced from the central port a distance equal to the distance between the inlet port and its peripheral ports, a passageway connecting said central port and said peripheral port, a second peripheral port diametrically opposite the first peripheral port, a third peripheral port spaced from the second by an angle of 60 degrees, and a passageway connecting said last mentioned two ports; means to force the rotatable disc against the stationary seat; and means to rotate said disc through an angle of 120 degrees in such a manner that the first peripheral port of the rotatable disc may register with either of the first two or the sixth ports of the seat and the second peripheral port of the disc may register with either the third, fourth or fifth ports of the seat.

3. A rotatable disc valve for controlling direction of flows through a filter comprising a stationary valve seat having an inlet port in the center of said seat and six equally spaced peripheral ports equidistant from the inlet port, two adjacent peripheral ports being connected to a common conduit adapted to be connected to the top of the filter, the third such port being connected to a waste outlet, the fourth and sixth such ports being connected to a common conduit adapted to be connected to the bottom of the filter, and the fifth such port being connected to an outlet conduit adapted to deliver treated water to use; a rotatable valve disc acting against the stationary valve seat, said rotatable valve disc having a central port registering with the inlet port of the stationary seat, a peripheral port spaced from the central port a distance equal to the distance between the inlet port and its peripheral ports, a passageway connecting said central port and said peripheral port, a second peripheral port diametrically opposite its first peripheral port, a third peripheral port spaced from the second in a counter-clockwise direction by an angle of 60 degrees, and a passageway connecting said last mentioned two ports; hydraulic means to force the rotatable disc against the stationary seat, said means comprising an upstanding wall around the periphery of the rotatable disc, a diaphragm across the open top of said rotatable disc, bearing means to oppose outward motion of said diaphragm and a pressure port between one of the passageways in the rotatable disc and the chamber formed therein by said diaphragm; and means to rotate the valve disc through an angle of 120 degrees in such a manner that the first peripheral port of the rotatable disc may register with either of the first two or the sixth ports of the stationary seat.

4. A rotary disc valve comprising a stationary valve seat, an inlet port in the center of said seat, six equally spaced peripheral ports equidistant from the inlet port, two adjacent peripheral ports being connected to a common conduit, the third such port being connected to a waste connection, the fourth and six such ports being connected to a common conduit and the fifth such port being connected to an outlet conduit, a rotatable valve disc acting against the stationary valve seat, said rotatable valve disc having a central port registering with the inlet port of the stationary seat, a peripheral port spaced from the central port a distance equal to the distance between the inlet port and its peripheral ports, a passageway connecting said central port and the peripheral port of the rotatable valve disc, a second peripheral port in said rotatable disc diametrically opposite the first peripheral port, a third peripheral port in said disc spaced from the second by an angle of 60 degrees, and a passageway connecting said last mentioned two ports, means to rotate the said disc, and hydraulic means to force the rotatable disc against the stationary seat, said means comprising an upstanding wall around the periphery of the rotatable disc, a diaphragm across the open top of said rotatable disc, bearing means to oppose outward motion of said diaphgarm and a pressure port between one of the passageways in the rotatable disc and the chamber formed therein by said diaphragm.

5. A rotary disc valve including a stationary seat and a rotatable disc coacting with said seat, said seat and disc each having a central port and a plurality of peripheral ports adapted to register with each other upon rotation of said disc to predetermined positions, and a passageway connecting said central port of said disc with one of the peripheral ports in said disc, characterized by means for holding said disc on said seat in all positions of said disc, said means comprising an upstanding wall around the periphery of the rotatable disc, a diaphragm across the open top of said rotatable disc, bearing means opposing outward motion of said diaphram, and a pressure port connecting said passageway in the rotatable disc with the chamber formed between said disc and said diaphragm in all positions of said disc.

6. A rotary disc valve including a stationary valve seat, an inlet port in the center of said seat, a plurality of peripheral ports in said valve seat, a rotatable valve disc coacting with the stationary seat, a central port in the rotatable disc registering with said inlet port, and peripheral ports in said rotatable disc located to register upon rotation of said disc with predetermined groups of said peripheral seat ports, and a passageway connecting said central port and one of said peripheral ports in said disc, characterized by improved means for seating said disc on said seat comprising an upstanding wall surrounding said disc, a diaphragm across the open top of said disc and forming therewith a chamber, means to oppose outward movement of said diaphragm, and a port connecting said passageway in the disc and said chamber in all positions of said disc.

7. In a multiple function rotary disc valve of the type specified, a valve seat having a central supply port and a row of ports concentric to said central port, a valve disc rotatably mounted on the said seat, said disc having a radial port common to the said central port of the seat and any one of the said concentric seat ports selectively, and a concentric port adapted to connect pairs of concentric seat ports, a pressure chamber across the open face of said valve disc, a port connecting said pressure chamber to said radial port in all positions of said disc, a diaphragm closure for said pressure chamber, a thrust plate and bearing on said diaphragm, a cover for said valve connected to and adapted to transmit the diaphragm thrust to said seat, and shaft means extending through said cover for rotating said valve disc with respect to said seat.

WALTER J. HUGHES.

REFERENCES CITED

The following references are of record in the file of this patent:

UNITED STATES PATENTS

| Number | Name | Date |
|---|---|---|
| 804,909 | Young | Nov. 21, 1905 |
| 1,052,173 | Reece | Feb. 4, 1913 |
| 1,614,890 | Kruttschinitt | Jan. 18, 1927 |
| 1,973,656 | Penati | Sept. 11, 1934 |
| 2,042,186 | Peterson | May 26, 1936 |
| 2,322,544 | Safford | June 22, 1943 |

FOREIGN PATENTS

| Number | Country | Date |
|---|---|---|
| 11,969 | Canada | of 1907 |